Feb. 13, 1951   J. I. HAASE   2,541,648
STITCHER WHEEL FOR TIRE BUILDING APPARATUS
Filed March 25, 1948
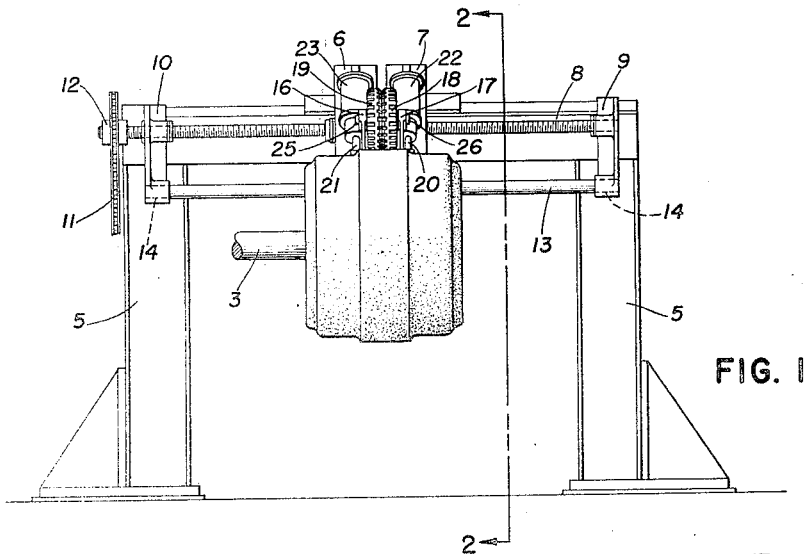
FIG. 1
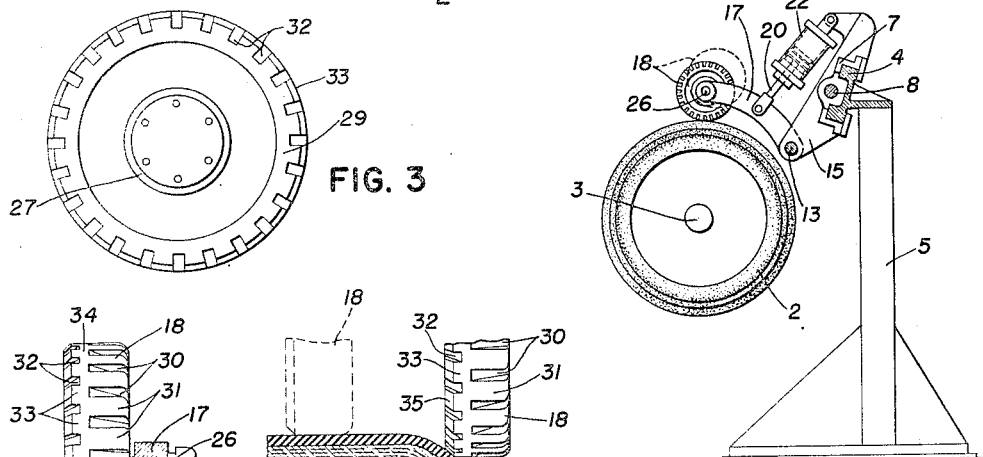
FIG. 3
FIG. 2
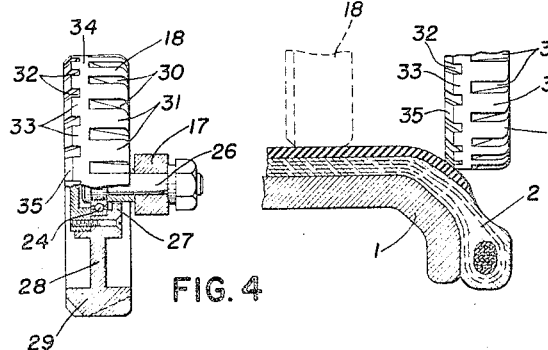
FIG. 4   FIG. 5
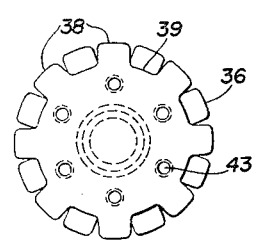
FIG. 6
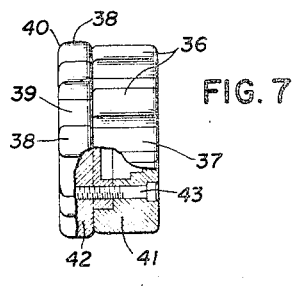
FIG. 7
INVENTOR.
JORGEN I. HAASE
BY R H Waters
ATTORNEY Patented Feb. 13, 1951

2,541,648

UNITED STATES PATENT OFFICE 2,541,648

STITCHER WHEEL FOR TIRE BUILDING APPARATUS

Jorgen I. Haase, Akron, Ohio, assignor to Wingfoot Corporation, Akron, Ohio, a corporation of Delaware Application March 25, 1948, Serial No. 16,989

6 Claims. (Cl. 154—9)

This invention relates to tire building apparatus and particularly to the stitching elements which function to stitch the various elements of a tire carcass into adhering relationship. In general the stitcher wheel embodies a combination stitcher and patter wheel provided with a relatively wide working face as compared with previous stitching wheels having a comparatively narrow continuous uninterrupted working face.

Stitcher wheels which are provided with continuous unbroken working faces exert a continuous pressure on the tire elements causing the loose material to bulge in the form of a wave ahead of the stitchers, the wave accumulating until it reaches such proportions that it folds over, permitting the stitchers to pass over the fold, causing wrinkles and air pockets, either of which would cause ply separation in the finished tire which may cause costly blowouts with the accompanying dangers to the occupants of a vehicle.

An object of this invention is to provide a stitcher wheel that will, during the course of the tire building operation, step or pat the various elements of a tire into their proper adhering relationship without the hazard of causing wrinkles or air pockets.

Another object is to produce a combination stitcher and patter wheel having a stitching face of relatively wide proportions, said face having formed therein series of ridges and grooves to break up localized pressure of the stitchers, thus eliminating the tendency of loose material bulging ahead of the revolving stitchers to prevent folds or wrinkles in the tire material.

A further object is to provide stitcher wheels that will intermittently step or pat the various plies of material into adhering relationship with the preceding plies so that loose material will be prevented from accumulating, thus assuring that the angle of the cords in the fabric portion of the tire will be in the proper relationship throughout the various plies. Also the tread and sidewall portions will be properly stepped and stitched to the fabric body free of bulges, wrinkles or air pockets.

A further object is to provide a stitcher wheel having a series of ribs and depressions formed in its face for stitching the straight surfaces of a tire and a series of angular ribs and depressions for stitching the angular and curved surfaces of the tread, sidewall, and bead portions of a tire body.

A still further object of the invention is that auxiliary mechanism used to assist the regular stitchers in smoothing out and laying down the various elements of a tire are eliminated.

The aforesaid objects of the invention and other objects and advantages will become more apparent as the description proceeds with reference to the accompanying drawings, wherein Figure 1 is a front elevation of part of a tire machine showing the relative position of the stitchers with the tire drum;

Figure 2 is a sectional view taken on the line 2—2 of Figure 1;

Figure 3 is a side view of a stitcher;

Figure 4 is an elevation, partially in section, of the stitcher shown in Figure 3;

Figure 5 is a fragmentary view, partially in section, showing the angular stitching face in operation;

Figure 6 is a side view of a slightly different form of stitcher;

Figure 7 is an elevation, partially in section, of the stitcher shown in Figure 6.

The stitchers may be practically applied to most any form of tire machine, one type being partially illustrated in Figures 1 and 2 of the drawing in which the numeral 1 designates a cylindrical drum upon which the various elements that form a tire 2 are assembled in the so-called flat-built method, which consists of forming two or more plies of fabric into endless bands, placing these bands on a collapsible drum, then stitching them into place. After one or more bands are applied, the tire beads are set in place, after which more bands are applied and finally the tread and sidewall elements are applied and stitched into their proper position. The drum or core is supported on a shaft 3 and caused to revolve by a source of power, not shown, suitably connected to said shaft.

A bar 4 supported by upright members 5 has slidably mounted thereon brackets 6 and 7 which respectively have formed therein right and left hand screw threads that correspond to right and left hand screw threads on a screw bar 8. The screw bar 8 is rotatably mounted in brackets 9 and 10 which are attached to the upper end of the upright members 5. The screw bar 8 is caused to rotate in either direction by a suitable source of power connected to the chain 11 and sprocket 12 attached to one end of the screw bar 8. Also mounted in the brackets 9 and 10, a bar 13 extends through bores 14 in the lower end of said brackets. The bar also extends through the bifurcated ends 15 of the brackets 6 and 7 and serves as a slide for the brackets to keep them in line to prevent binding on the screw bar 8.

Swingably mounted on the stabilizing bar 13 in bifurcations provided in the brackets 6 and 7, stitcher arms 16 and 17 have mounted on their ends stitchers or rollers 18 and 19 which are held in pressed relationship with the tire body by piston rods 20 and 21 attached to pistons within fluid pressure cylinders 22 and 23 which are pivotally suspended from the brackets 6 and 7.

The stitchers 18 and 19 equipped with ball bearings 24 are rotatably mounted on spindles 25 and 26 which are mounted in the outer ends of the arms 16 and 17 which move laterally with the brackets 6 and 7, causing the stitchers to travel laterally away from one another from the center of the tire body to the outer edges thereof, then withdrawn therefrom by a reverse action of the pressure cylinders and returned to the center of the tire by the screw bar which is caused to rotate in the opposite direction.

Referring to Figure 4, stitchers of the present invention depart from conventional stitchers of the disc type, having narrow continuous stitching faces, in that they are formed with a central hub 27 in which is mounted a ball bearing 24 to receive spindle 26. Extending radially from said hub, a web 28 has formed at its outer periphery a rim 29 which takes the form of a cylindrical drum of relatively wide proportions as compared with previous stitchers. The outer face of the rim 29 is the working face and has formed therein series of grooves and ridges. One series of grooves 30 and ridges, ribs or lands 31 are formed to extend from the outer edge of the stitcher and terminate beyond the circumferential center line. A series of grooves or flutes 32 and ribs or lands 33 extend from the opposite side of the stitcher face toward the center line but terminate short of the terminating points of the grooves 30 and 31 in staggered relationship thereto. Between the terminating points of the series of grooves a circumferential continuous rib 34 is provided for a continuous stitching of the tire material after it has been patted or beaten into its proper place by the ribs 31.

It will be noted that the ribs 33 are chamfered to form angular surfaces or faces 35 for the purpose of stitching or tapping the various plies of tire material into place on curved or angular surfaces as shown in Figure 5.

The combination stitcher and patter wheels as illustrated in Figures 3, 4 and 5, working in pairs as shown in Figure 1, are in contact with one another at the circumferential center line of the tire body. As each succeeding band of tire material is applied, the drum 1 is caused to revolve, the stitcher wheels in contact with the tire material also revolve and by the action of the screw bar 8 move away from one another from the center of the tire body to the outer edges thereof. During this cycle the ribs or ridges 31 are first to contact the tire plies to step the material into adhesion with the preceding plies by a patting or beating action which prevents waves or piling up of the material ahead of the stitcher wheels to avoid wrinkles or air pockets in or between the various plies of material. The circumferential rib 34 follows the ribs 31 to smooth down and provide continuous adhesion. The ribs 33 then continue the patting or beating down of the various plies. By being staggered with respect to the ribs 31 they will beat down more securely the surfaces which passed under the grooves 30 between the ribs 31. The angular surfaces 35 follow the ribs 33 to stitch the angular or curved surfaces of the tire body as illustrated in Figure 5.

Figures 6 and 7 illustrate a slightly different form of stitcher wheel which may be employed to advantage on heavy duty tires constructed by the pulley band method in which the pulley bands are formed with more than two plies of fabric and rather heavy tread and side walls. In such tires the stitcher pressure is localized beyond the surface of contact due to the thickness and comparative stiffness of the various elements that form the tire.

These stitcher wheels are formed with two series of ribs and grooves in their working faces, as illustrated in Figures 6 and 7. A series of ribs 36 and grooves 37 are formed in the face in staggered interpolated relationship with the series of ribs 38 and grooves 39, both series of ribs and grooves extending from the edges of the stitching face to a common circumferential line which provides a substantial uninterrupted surface along said line. The outer corners of the ribs 38 are rounded at 40 to provide a suitable surface for stitching rounded or angular surfaces. This form of stitcher wheel may be constructed of a solid piece of material or may be made in two pieces 41 and 42 interlocked and bolted together by the bolts 43.

While the best known embodiment of the invention has been illustrated and described in detail, it is to be particularly understood that the invention is not limited thereto or thereby, but that the inventive scope is defined in the appended claims.

I claim:

1. A stitching means for use in tire building apparatus for applying pressure to and intimately bonding together the tire materials in the course of building operations, said stitching means comprising a generally cylindrical member on the outermost periphery of which is disposed a plurality of spaced parallel lateral grooves extending inwardly from and terminating substantially intermediate the ends of the member, the grooves on one end of said member being of a lesser dimension laterally of the periphery of the member and being disposed in alternating relation to the grooves in the opposite end thereof.

2. A stitcher wheel for tire building apparatus for stitching the elements of a tire carcass into adhering relationship, comprising a wheel having a relatively wide circumferential working face, said face having a plurality of series of unyielding lateral parallel ribs disposed thereon, said ribs extending in series from the edges of said face, one series of ribs being of greater length than and staggered with respect to the other series and a substantially continuous circumferential area of annular configuration interposed between the series of ribs.

3. A stitching means for tire building apparatus, for applying pressure to and intimately bonding together the tire materials in the course of building operations, said stitching means comprising a generally cylindrical member having a chamfer on one edge thereof, a plurality of grooves arranged in uniformly spaced relation about the chamfer and extending inwardly therefrom only part way across the peripherial surface of the cylindrical member, and a corresponding number of grooves arranged about the other edge of the cylindrical member and extending part way across its peripherial surface in alternate relation to the first mentioned set of grooves.

4. A stitching means of the type defined in claim 3 in which the first set of grooves is shorter than the second set.

5. A stitching means of the type defined in claim 4 in which a continuous rib is formed between the innermost extremities of the grooves extending circumferentially of the peripherial surface of the cylindrical member.

6. A stitching means of the type defined in claim 5 in which the circumferential rib between the innermost extremities of the several grooves together with the land portions between the several grooves form a continuous uninterrupted pattern, said land portions being of greater area than the grooves.

JORGEN I. HAASE.

REFERENCES CITED

The following references are of record in the file of this patent:

UNITED STATES PATENTS

| Number | Name | Date |
| --- | --- | --- |
| 1,383,601 | Conners | July 5, 1921 |
| 1,465,177 | Richter | Aug. 14, 1923 |
| 1,760,929 | Wikle | June 3, 1930 |
| 1,763,591 | Maas | June 10, 1930 |
| 2,381,379 | Stevens | Aug. 7, 1945 |
| 2,439,064 | Sternad | Apr. 6, 1948 |

FOREIGN PATENTS

| Number | Country | Date |
| --- | --- | --- |
| 117,101 | Australia | June 8, 1943 |